United States Patent
Gapud et al.

Patent Number: 5,820,997
Date of Patent: Oct. 13, 1998

[54] DECORATIVE HIGH-PRESSURE LAMINATES MADE WITH THERMOSETTING MELAMINE RESINS MODIFIED WITH SORBITOL

[75] Inventors: Ben Gapud, Lawrenceville, Ga.; Mark Peters, Moon Township, Pa.

[73] Assignee: Georgia-Pacific Resins, Inc., Atlanta, Ga.

[21] Appl. No.: 636,607

[22] Filed: Apr. 23, 1996

[51] Int. Cl.⁶ .................................................. B32B 27/08
[52] U.S. Cl. ...................... 428/503; 428/524; 428/526; 524/598
[58] Field of Search .................... 428/524, 526, 428/503; 524/598

[56] References Cited

U.S. PATENT DOCUMENTS

| | | |
|---|---|---|
| 2,374,812 | 5/1945 | Gutkin ........................................ 260/42 |
| 2,817,614 | 12/1957 | Fraser . |
| 3,194,719 | 7/1965 | Larkin et al. . |
| 3,194,720 | 7/1965 | Grudus et al. . |
| 3,194,722 | 7/1965 | Grudus et al. . |
| 3,716,395 | 2/1973 | Bauer et al. . |
| 4,088,807 | 5/1978 | Sakata et al. . |
| 4,250,282 | 2/1981 | Dörries et al. . |
| 4,369,286 | 1/1983 | Czepel et al. . |
| 4,430,494 | 2/1984 | Hönel et al. . |
| 4,480,068 | 10/1984 | Santos . |
| 4,996,289 | 2/1991 | Berbner et al. . |
| 5,206,066 | 4/1993 | Horacek . |

*Primary Examiner*—E. Rollins Buffalow
*Attorney, Agent, or Firm*—Banner & Witcoff, Ltd.

[57] ABSTRACT

A decorative, high-pressure laminate produced with a sorbitol-modified melamine-formaldehyde resin and methods of making high-pressure laminates.

18 Claims, 1 Drawing Sheet

DECORATIVE HIGH-PRESSURE LAMINATES MADE WITH THERMOSETTING MELAMINE RESINS MODIFIED WITH SORBITOL

FIELD OF THE INVENTION

The present invention relates to decorative high-pressure laminates made with sorbitol-modified, melamine-formaldehyde resins, and to methods of making the high-pressure laminate. The high-pressure laminates can be used for furniture, countertops or flooring.

BACKGROUND OF THE INVENTION

Aminoplast resins are often used in the saturation of decorative and overlay paper for the preparation of decorative laminates because of their excellent color, hardness, and solvent, water, and chemical resistance. They are also resistant to heat and abrasion. Many patents exist describing the use of aminoplast resins in these applications. Unfortunately, unmodified melamine resins have very short shelf lives, e.g., 1–3 days, after which time the resin begins to separate from solution. Laminates produced from such unmodified aminoplast resins also are very brittle and cannot be post-formed to produce clear, crack-free surfaces.

Many of the shortcomings of unmodified aminoplast resins can be addressed by the introduction of various resin modifiers. These modifiers can increase the shelf life of aminoplast resins, can increase flow during processing, can increase the cured resin's flexibility, and/or can be used to increase post-formability of a laminated product. Often, a plasticizer is added to aminoplast formulations to improve shelf life and to aid post-formability. Suitable plasticizers which have been used in this regard include sucrose, sorbitol, alkylguanamines, aliphatic polyols, aromatic amides, aromatic amines, polyvinyl alcohol, monocarbamates, caprolactam, isocyanuarates, etc. U.S. Pat. No. 3,716,395, for example, describes a laminated material which contains, inter alia, a coating layer comprised of, for example, melamine- and/or urea-formaldehyde resins, a pigment, and a plasticizer.

Unfortunately, the steps taken to improve post-formability often create laminates whose color, clarity, or chemical and water resistance are adversely affected. Specifically, for instance, sugar-modified melamine-formaldehyde resins often yellow when subjected to heat and pressure as the laminate is cured. This is particularly a problem for products made by a high-pressure lamination.

SUMMARY OF THE INVENTION

The object of the present invention is to modify a thermosetting melamine-formaldehyde (MF) resin with sorbitol such that the color of the final, high-pressure laminate using the resin is much improved, as compared to conventional MF resins which use sucrose as a plasticizer, while still producing a post-formable laminate which maintains its chemical and water resistance.

The present invention is directed to a high-pressure laminate comprising a substrate impregnated with a sorbitol-modified melamine-formaldehyde resin and subjected to a pressure of about 1000 to 2000 psi during cure. The sorbitol modified melamine formaldehyde resin comprises the reaction product of an aqueous, alkaline solution of formaldehyde, melamine, and sorbitol.

High pressure laminates described in U.S. Pat. Nos. 3,194,720, 3,194,722, and 3,194,719 are prepared from the co-condensation products of an aminotriazine, an aldehyde, and either an anhydride of sorbitol, an olefin oxide of sorbitol, or a 1,3,4,6-sorbide, respectively. However, none of the prior art recognizes that sorbitol itself is an effective modifier for a resin used in a high-pressure lamination process.

It is to be understood that both the foregoing general description and the following detailed description are exemplary and explanatory only, and are not restrictive of the present invention as claimed.

BRIEF OF THE DRAWINGS

DETAILED DESCRIPTION OF THE INVENTION

Figure 1:
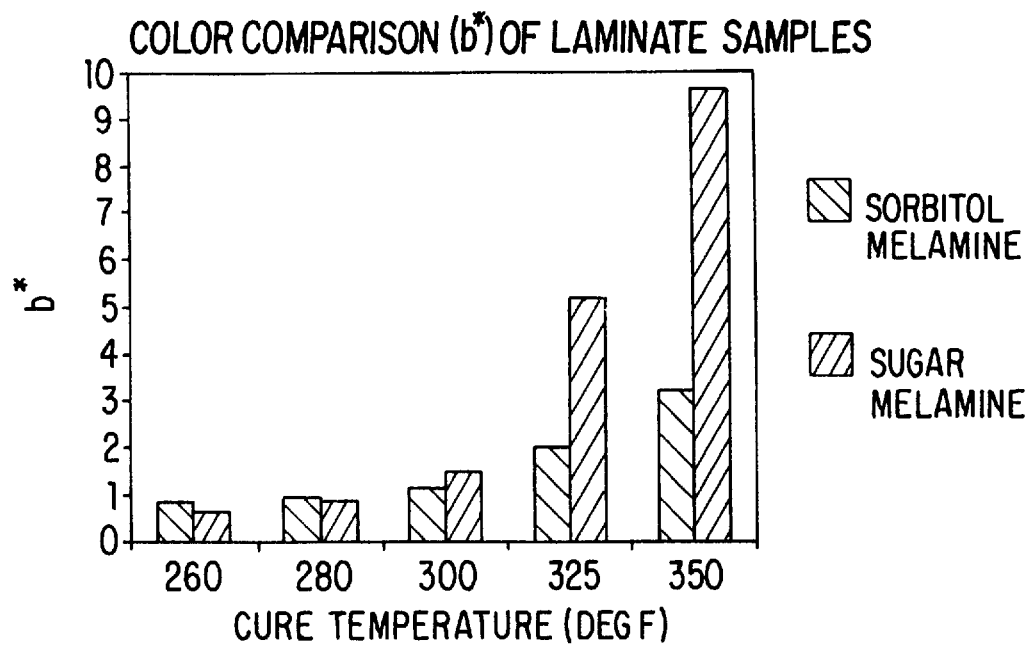
FIG. 1 depicts the color comparison (b*) of laminate samples as a function of cure temperature.

The present invention relates to a process of making a decorative, high-pressure laminate using a thermosetting, sorbitol-modified melamine resin. High-pressure laminates produced with a sorbitol-modified melamine resin are clearer (more transparent) and less yellow than laminates made with sugar- (sucrose) modified resins. In the context of the present invention, "high-pressure" is defined as a pressure of generally between about 1000 and 2000 psi.

In accordance with a preferred practice of the present invention for making the modified resin, an aqueous solution of formaldehyde is combined with melamine and sorbitol and reacted under alkaline conditions. Water is added before, during, or after the reaction is complete so that the resin contains about 40–60% solids. The temperature of the reaction mixture is held between about 60° C. and atmospheric reflux until a final water tolerance of 200–400% by volume is reached. The resin at this water tolerance is stable for about 4–6 weeks at 25° C.

Although melamine is specifically mentioned in the practice of this invention, the melamine may be totally or partially replaced with other suitable amine-containing compounds. Other suitable compounds include urea, thiourea, dicyandiamide, melem, melam, melon, ammeline, ammelide, substituted melamines, guanamines, or mixtures thereof. Substituted melamines include the alkyl melamines and aryl melamines which can be mono-, di-, or tri- substituted. In the alkyl-substituted melamines, each alkyl group can contain 1 to 6 carbons and, preferably, 1 to 4 carbons. Typical examples of some of the alkyl-substituted melamines are monomethylmelamine, dimethyl melamine, trimethyl melamine, monoethyl melamine, and 1-methyl-3-propyl-5-butyl melamine. In the aryl-substituted melamines, each aryl group can contain 1–2 phenyl moieties and, preferably, 1 phenyl moiety. Typical examples of an aryl-substituted melamine are monophenyl melamine or diphenyl melamine. Based on considerations of cost and availability, standard melamine is generally preferred.

The guanamines which can be employed in the practice of this invention can be of any of the cycloaliphatic guanamines. Preferably, the cycloaliphatic guanamines should not contain more than 15 carbon atoms. Typical examples of some of the cycloaliphatic guanamines are tetrahydrobenzoguanamine, hexahydrobenzoguanamine, 3-methyl-tetrahydrobenzoguanamine, 3-methyl-hexahydrobenzoguanamine, 3,4-dimethyl- 1,2,5,6-tetrahydrobenzoguanamine, and 3,4- dimethylhexahydrobenzoguanamine and mixtures thereof. A preferred cycloaliphatic guanamine is tetrahydrobenzoguanamine. Mixtures of aminotriazine compounds include melamine and an alkyl substituted melamine, such as tetrahydrobenzoguanamine, or melamine and a cycloaliphatic guanamine, such as tetrahydrobenzoguanamine. Other guanamines which might be used include acetoguanamine, formoguanamine, or benzoguanamine.

Formaldehyde can be used alone or in combination with a variety of other aldehydes or their equivalents heretofore employed in the formation of melamine resins including, for example, acetaldehyde, propionaldehyde, butylaldehyde, furfuraldehyde, benzaldehyde, acrolein, methacrolein, and crotonaldehyde. In general, the aldehydes employed have the general formula R'CHO, wherein R' is a hydrogen or hydrocarbon moiety generally containing 1 to 8 carbon atoms. Formaldehyde is preferred in most applications. Formaldehyde can be supplied in any one of its commonly available forms, including formalin solutions and paraformaldehyde. Formaldehyde is generally used as an aqueous solution at a concentration of 30–50%.

The formaldehyde-to-melamine mole ratio is preferably between about 1.2 and 2.0 and, more preferably, between about 1.5 to 1.8 in the reaction mixture.

Sorbitol is added to the aqueous formaldehyde solution prior to, concurrently with, or after the addition of the melamine, the sorbitol is added at a concentration of 1 to 30%, preferably at a concentration of 1 to 12%, based on the total weight of the ultimately formed resin.

The alkaline conditions of the reaction mixture of the present invention may be achieved simply by adding a base to the reaction mixture to achieve a pH of between 7 and 11, preferably between 8.5 and 10.5 and, more preferably, between about 9.0 and 9.5. Suitable bases include, but are not limited to, alkali metal hydroxides, such as sodium, lithium, or potassium hydroxide. Other bases include alkali metal carbonates, such as sodium carbonate and potassium carbonate, alkaline earth hydroxides, such as magnesium hydroxide, calcium hydroxide and barium hydroxide, aqueous ammonia, and amines, such as triethanolamine.

Additives typically used in melamine-formaldehyde resins also may be added to the previously prepared resin of the invention, for example fire retardants, pigments, extenders, fillers, catalysts, and the like. It is well known to those skilled in the art to add appropriate additives, as required, to improve particular laminate properties.

When preparing laminates employing the resins of this invention, it may be desirable to add a catalyst to the resin in order to aid in the curing process. Common catalysts include inorganic acids, e.g., sulfuric, hydrochloric, phosphoric, boric, etc.; organic acids and anhydrides, e.g., acetic, tartaric, benzoic, propionic, adipic, oxalic, fumaric acids, hexachloric phthalic anhydride, maleic anhydride, etc. Other catalysts which can be employed are those which liberate acid when heated. Such catalysts include the amine salts of organic and inorganic acids, such as the hydrochloric salt of 2-amino-2-methyl propanol, the hydrochloric salt of mono-, di-, or triethanol amine, the hydrochloric salt of 2-dimethylamino-2-methyl propanol, the amine salts of para-toluene sulfonic acid, the chloroacetic acid salt of pyridine, the triammonium acid pyrophosphate salt of aminomethyl propanol, the phosphoric acid salt of 2-dimethylamino-2-methyl propanol, ethylene sulfite, etc. Other catalysts include the inorganic salts of inorganic acids, such as ammonium chloride, magnesium chloride, zinc chloride, etc. The catalyst system might also include mixtures of the aforementioned catalysts.

Catalysts are added in an amount from about 0.1 to 10 wt %, preferably about 0.1 to 1.5 wt % and, most preferably, about 0.2 wt %, based on the resin solids. The catalyst may be added in the reaction vessel or to the laminating syrup immediately prior to preparation of a laminate.

The preparation of decorative, high-pressure laminates is well known to those skilled in the art, and need not be described in detail. Laminates can be prepared from (1) a rigid substrate, (2) a melamine resin impregnated decorative sheet, and, in some cases (3) a melamine resin impregnated overlay sheet. In such decorative laminates, the rigid substrate may consist of any suitable material, such as particle board, a resin-binded wood fiberboard, a plurality of phenolic resin-impregnated sheets, etc. These composites are heated under high pressure to form a single component which can be incorporated into furniture, used on countertops or flooring, etc.

The amount of resin incorporated into these laminates varies from 30% to 80% based on the weight of the total laminate, and depends on the type of application and the type of materials used to make the laminate. The lower percentages are generally used for decorative print sheets and the higher in overlay sheets. After the paper is impregnated with the aqueous resin, it is dried to a suitable volatile content and the sheets are then assembled into a laminate between two pressing plates. The laminate is then formed in this fashion under a specific pressure (generally 1000–2000 psi) and temperature (generally 250°–350° F.) for periods of 5 to 45 minutes. The laminate made in this manner must then pass several physical tests, including post-formability and resistance to boiling water.

EXAMPLES

The invention will be further described by reference to the following examples. These examples should not be construed in any way as limiting the invention:

Example 1

Preparation of Sorbitol Modified-Melamine/Formaldehyde Resin:

A formalin solution (about 1300 g, 50% formaldehyde) was added to a reactor and diluted with about 1300 g of water. Melamine (about 1800 g) and sorbitol (about 600 g) were added to a reactor and the pH was adjusted to 9.0–9.5 with caustic. The slurry was heated to atmospheric reflux and held at this temperature until an ice-water hydrophobe was reached. (An ice-water hydrophobe was determined by pouring the resin dropwise into an ice-water bath. The hydrophobe is the point at which the water becomes cloudy.) The reaction mixture was then cooled to 85° C. and held there until the condensation reaction reached a water tolerance of 200–400% by volume.

Water tolerance is determined by adding water dropwise to 10 ml of resin adjusted to 25° C., until the resin turns turbid. The volume of water used is divided by the volume of resin and multiplied by 100 to obtain the % water tolerance of the resin. This is a relative measure of the degree of molecular weight advancement of the resin; a lower water tolerance reflects a more advanced resin.

Example 2

Preparation of laminates for color testing:

White decorative paper was saturated with sorbitol-modified melamine resin catalyzed with an amine blocked toluene sulfonic acid and B-staged at 150° C. for 1 min.

After B-staging, 2 impregnated sheets of paper were sandwiched around another unimpregnated sheet and cured under 1000 psi of pressure at 127° C. for 5 mins. Other laminates were made in a similar fashion but were cured at 138, 150, 163, and 177° C. under pressure for 5 mins.

Example 3

Preparation of Sugar Modified-Melamine/Formaldehyde Resin:

A formalin solution (about 1300 g, 50% formaldehyde) was added to a reactor and diluted with about 1300 g of water. Melamine (about 1800 g) and sucrose (about 600 g) were added to a reactor and the pH was adjusted to 9.0–9.5 with caustic. The slurry was heated to atmospheric reflux and held at this temperature until an ice water hydrophobe was reached. The reaction mixture was then cooled to 85° C. and held there until the condensation reaction reached a water tolerance of 150–200% by volume.

Example 4

Preparation of laminates for color testing:

Laminates were made in an analogous fashion to that described in example 2 with the exception that the sugar modified-melamine/formaldehyde resin was used to impregnate the decorative paper.

Example 5

Figure 2:
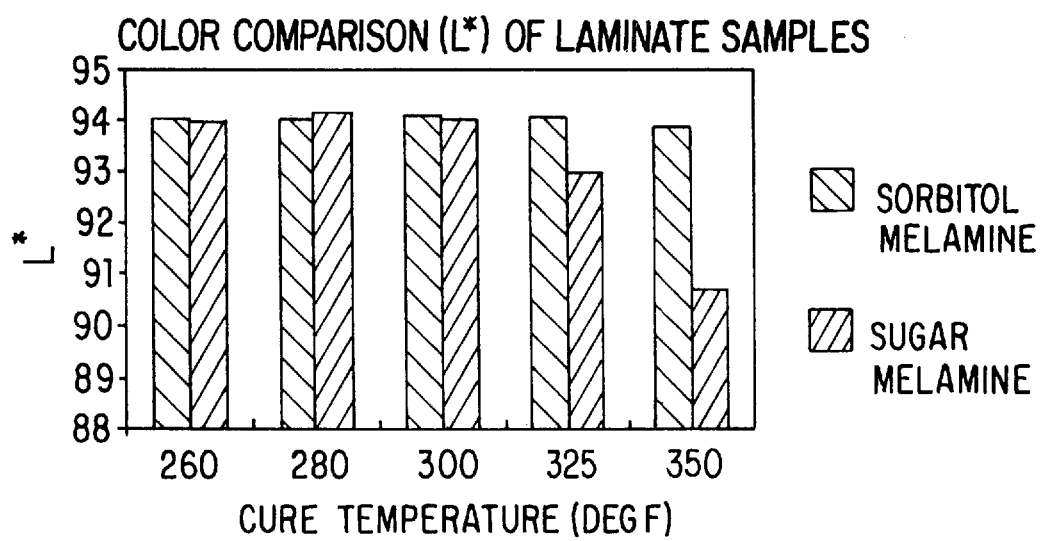
FIG. 2 depicts the color comparison (L*) of laminate samples as a function of cure temperature.

Analysis of Color:

A Milton Roy Colormate Color Analyzer was used to measure the degree of yellowness in the laminate samples. Overcast daylight illumination was used at a 10° angle of incidence and the L*a*b* color scale was measured. As one can see from FIG. 1, the sorbitol resin produced much less yellowing in the laminate than did the sugar-modified resin, especially at temperatures at or above 150° C. (302° F.), based on the b* portion of the color analysis. The sorbitol-based resin also produced a lighter laminate as shown in FIG. 2 based on the L* portion of the color analysis. This effect is more prominent at temperatures above 150° C. (302° F.).

L*, a*, and b* is a three-dimensional measurement of color tone. The L* value measures the lightness (whiteness, higher L* value) or darkness (blackness, lower L* value) of a color. The a* value measures the redness (higher +a* value) or greenness (lower −a* value) of a color. The b* value measures the yellowness (higher +b* value) or blueness (lower −b* value) of the color. The laminate structures containing the sorbitol-modified resin of the present invention provided lower +b* values which indicates less yellowing.

It will be apparent to those skilled in the art that numerous modifications and variations can be made in the compositions and methods of the present invention without departing from the spirit or scope of the invention. Thus, it is intended that the present invention cover the modifications and variations of this invention provided they come within the scope of the appended claims and their equivalent

What is claimed is:

1. A decorative, high-pressure laminate made by impregnating a substrate with a sorbitol-modified melamine-formaldehyde resin and pressing the substrate to a pressure of about 1000 to 2000 psi;
   wherein the sorbitol-modified melamine-formaldehyde resin comprises the reaction product of an aqueous, alkaline solution of formaldehyde, melamine, and sorbitol.

2. The laminate of claim 1, wherein the reaction product is produced at a temperature of between about 60° C. and atmospheric reflux.

3. The laminate of claim 2, wherein the reaction product is produced at reflux temperature.

4. The laminate of claim 1, wherein the sorbitol-modified melamine-formaldehyde resin has a water tolerance of 200–400% by volume.

5. The laminate of claim 1, wherein the sorbitol-modified melamine-formaldehyde resin is made at a mole ratio of formaldehyde to melamine of between about 1.2 and 2.0.

6. The laminate of claim 1, wherein the sorbitol-modified melamine-formaldehyde resin contains sorbitol in an amount of about 1 to 30% based on the total weight of resin.

7. The laminate of claim 6, wherein the sorbitol-modified melamine-formaldehyde resin contains sorbitol in an amount of about 1 to 12% based on the total weight of resin.

8. The laminate of claim 1, wherein an acid catalyst is added to the resin.

9. The laminate of claim 8, wherein the acid catalyst is an amine salt of paratoluene sulfonic acid.

10. The laminate of claim 8, wherein the ratio of catalyst to total resin weight is between about 0.1 and 1.5%.

11. The laminate of claim 10, wherein the ratio of catalyst to total resin weight is about 0.2%.

12. A method of making a high-pressure laminate comprising impregnating a substrate with a sorbitol-modified melamine-formaldehyde resin and pressing the substrate at a pressure of 1000 to 2000 psi;
   wherein the sorbitol-modified melamine-formaldehyde resin comprises a reaction product of an aqueous, alkaline solution of formaldehyde, melamine, and sorbitol.

13. The method of claim 12, wherein the reaction product is produced at a temperature of between about 60° C. and atmospheric reflux.

14. The method of claim 13, wherein the reaction product is produced at a temperature at atmospheric reflux.

15. The method of claim 12, wherein the reaction is carried out until the resin has a water tolerance of 200–400% by volume.

16. The method of claim 12, wherein sorbitol is added in an amount of about 1 to 30% based on the total weight of resin.

17. The method of claim 16, wherein sorbitol is added in an amount of about 1 to 12% based on the total weight of resin.

18. The method of claim 12, wherein an acid catalyst is added to the resin.

* * * * *